United States Patent [19]

Kondo et al.

[11] Patent Number: 4,681,647

[45] Date of Patent: Jul. 21, 1987

[54] METHOD FOR JOINING A FIBER-REINFORCED PLASTIC STRUCTURE

[75] Inventors: Katsumi Kondo; Yasuhiro Tsuchiya, both of Toyota; Takatsune Niimi, Aichi; Takashi Yamamoto, Ichinomiya; Kunihiro Matsuba, Nagoya, all of Japan

[73] Assignee: Toyota Jidosha Kabushiki Kaisha, Toyota, Japan

[21] Appl. No.: 745,931

[22] Filed: Jun. 18, 1985

[30] Foreign Application Priority Data

Jun. 19, 1984 [JP] Japan .................. 59-126241

[51] Int. Cl.⁴ ........................... B65H 81/00
[52] U.S. Cl. .................................... 156/172
[58] Field of Search .............. 156/172, 169, 175; 264/103, 258, 257; 74/579 R, 572, 552

[56] References Cited

U.S. PATENT DOCUMENTS

| | | | |
|---|---|---|---|
| 4,137,354 | 1/1979 | Mayer et al. | 156/175 |
| 4,183,259 | 1/1980 | Giovachini et al. | 74/572 |
| 4,419,908 | 12/1983 | Reikiroski | 74/552 |
| 4,483,214 | 11/1984 | Mayer | 156/172 |

FOREIGN PATENT DOCUMENTS

| | | |
|---|---|---|
| 3038948 | 10/1980 | Fed. Rep. of Germany . |
| 1561120 | 11/1967 | France . |
| 2418487 | 2/1979 | France . |
| 2468156 | 10/1980 | France . |
| 2515094 | 1/1982 | France . |
| 5249443 | of 0000 | Japan . |
| 5591453 | 12/1978 | Japan . |
| 5657576 | 10/1979 | Japan . |
| 55-115117 | 4/1980 | Japan . |
| 59-143764 | 8/1984 | Japan . |
| 2004835 | 9/1978 | United Kingdom . |
| 2061848 | 10/1979 | United Kingdom . |
| 2041858 | 9/1980 | United Kingdom . |

*Primary Examiner*—Michael W. Ball
*Attorney, Agent, or Firm*—Oblon, Fisher, Spivak, McClelland & Maier

[57] ABSTRACT

A method for joining a fiber-reinforced plastic structure to a metallic insert for fitting around a rotary shaft is disclosed. The method comprises winding a resin-impregnated strand of continuous long-staple fibers around an engaging means formed on the metallic insert thereby effecting the desired union. By this method, a rotatable element such as a wheel, a hand-wheel or the like, such as a steering wheel can be produced.

2 Claims, 12 Drawing Figures

FIG. 1
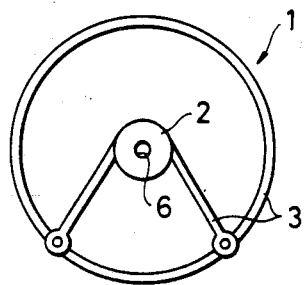
FIG. 2
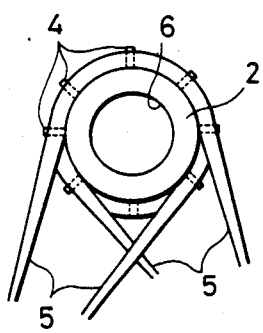
FIG. 3
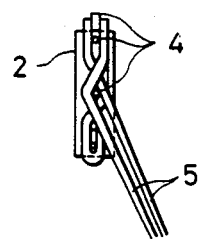
FIG. 4(A)    FIG. 4(B)
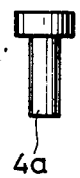    

METHOD FOR JOINING A FIBER-REINFORCED PLASTIC STRUCTURE

BACKGROUND OF THE INVENTION

1. Field of the Invention

The present invention relates to a method for joining a structure made of fiber-reinforced plastics to a metal fixture. This invention, more specifically relates to rotatable elements, such as to wheels, handwheels or the like made by said method.

2. Discussion of the Background

Wheels, such as hand-wheels or steering wheels have heretofore been manufactured by a method which comprises curing a fiber-reinforced plastic structure in a shape conforming to the shape of the wheel being produced, then subjecting the cured structure to a prescribed aftertreatment (e.g., a mechanical treatment), fitting into the structure a metallic insert for attachment to a rotary shaft, and bonding the fiber-reinforced plastic structure to the metallic insert with an adhesive agent (e.g., a thermosetting resin). This method, however, suffers varied drawbacks. The aftertreatment tends to break the reinforcing fibers, and often causes strength degradation in the fiber-reinforced plastic structure. Further since this method of bonding relies on the use of an adhesive agent, the strength of bonding between the fiber-reinforced plastic structure and the metallic insert is limited to the bonding strength of the adhesive agent used. On exposure to repeated abrupt changes of temperature, the fiber-reinforced plastic structure and the metallic insert may separate from each other. Thus, this method has among other disadvantages, the disadvantage of insufficient bonding reliability.

British Patent No. GB 2 004 835 A discloses a resin-impregnated fiber strand obtained by impregnating continuous long-staple fibers such as, for example, glass fibers, carbon fibers, etc., with resin such as a polyester resin. This material has begun to find utility as backbone materials in various lattice structures, such as pylons, aeroplane fuselages, bridge grid structures, etc.

Accordingly, there continues to exist a need for a method for manufacturing wheels, hand-wheels or the like which are resistant to deterioration and breakage and have enhanced reliability. This method should also not inflict breakage of the reinforcing fibers.

SUMMARY OF THE INVENTION

The present invention, which originated in a study of the aforementioned resin-impregnated strand of continuously long-staple fibers, has as an object providing a method for joining a fiber-reinforced plastic structure with notably improved bonding strength and enhanced reliability without suffering from the drawbacks noted above.

Another object of this invention is to provide a method for joining a fiber-reinforced plastic structure.

Another object of this invention is to provide a rotatable element, such as a wheel, a hand-wheel or the like containing a high strength joint formed by the use of method of this invention. In particular the handwheel may be a steering wheel.

The term "wheel" will be used throughout the specification. It is to be understood that this term is intended to encompass any rotatable element.

The method for joining the fiber-reinforced plastic structure according to the present invention is characterized by the manufacture of a wheel, a handwheel or the like, such as a steering wheel, by centrally arranging an insert material for a hub portion and another insert material for a ring portion at the place surrounding the central insert material. Resin-impregnated strands of continuous long-staple fibers are then wound around and stretched between both insert materials. This winding is carried out continuously, thus forming a hub portion, a rim portion and spoke portions. The resin-impregnated fiber strands are wound around a substantial circumferential portion of the insert and are simultaneously wound around pin type engaging means of a metallic insert as an insert material for a hub portion, and are then cured to form a fiber-reinforced plastic structure joined to the metallic insert.

In the present invention, the term wheel, handwheel or the like designates a member which is rotated by an external force (e.g., rotary force) transmitted thereto through a rotary shaft. Further, the term "metallic insert" designates an insert material for a hub portion having a fitting hole through which the rotary shaft is inserted, and capable of being fitted and fixed to the rotary shaft.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a front view illustrating a steering wheel in which the present method for joining a fiber-reinforced plastic structure, described in Example 1, of this invention is applied.

FIGS. 2 and 3 are a front view and a side view, respectively, illustrating a hub portion during the course of the formation of the steering wheel of FIG. 1.

FIGS. 4A and 4B are front views illustrating modified versions of the engaging member in the hub portion of FIG. 3.

DETAILED DESCRIPTION OF THE PREFERRED EMBODIMENTS

The present invention relates to molding a resin-impregnated strand of continuous long-staple fibers directly wound on a metallic insert. This configuration prevents the resultant fiber-reinforced plastic structure and the metallic insert from being rotated independently of each other when the molded rotatable element is fixed to a rotary shaft.

The term "continuous long-staple fibers" as used in the present invention designates continuous fibers or rovings formed, e.g., by a roving process. Examples of continuous long-staple fibers which are advantageously used in the practice of this invention include glass fibers, carbon fibers, polyamide fibers, and various ceramic fibers. Carbon fibers of high strength and high elasticity are especially preferred because of their light weight. Optionally, fibers of two or more types may be mixed to suit a particular purpose. The fibers to be used for this invention are not particularly discriminated by the thickness of individual fibers or the number of fibers in the strand. Glass fibers are desired to have a diameter of from about 8 to 30 $\mu$m, preferably about 15 $\mu$m. Carbon fibers are desired to have a diameter in the range of from about 7 to 15 $\mu$m. From about 2,000 to about 30,000 of these fibers are used in a strand. Thus, the resin-impregnated strand of the continuously long-staple fibers has a diameter in the range of a little over 1 mm to a little under 10 mm, preferably, 2 to 3 mm.

Examples of the resin to be used in impregnating the continuously long-staple fibers include thermosetting resins such as epoxy resins for example, Araldite LY 556, HY 917J, DYO 70 manufactured by CIBA-GEIGY Limited, unsaturated polyester resins, phenol resins, and polycarbonate resins, etc., and thermoplastic resins such as polystyrene, polyvinyl chloride, and polyurethane resin, etc. These resins may be used either singly or in combinations of two or more. The viscosity of the resin solution to be used for impregnating the fibers should be in the range of 50 to 250 cp, preferably 100 to 200 cp, and more preferably around 150 cp.

In the production of the rotatable element by the method of this invention, it is only required that the metallic insert be provided with a fitting hole for fitting around the rotary shaft and an engaging means on which the resin-impregnated strand of fibers is wound. The engaging means therefore has only to be so adapted that the fiber-reinforced plastic structure formed thereon and the metallic insert will not be allowed to rotate independently of each other. Preferably, this engaging means is formed by disposing a multiplicity of regularly spaced pins, or by forming a groove at a position bordering on or separated from the edge of the aforementioned fitting hole so as to guide and keep in place fast the resin-impregnated strand of fibers.

Figure 10A:
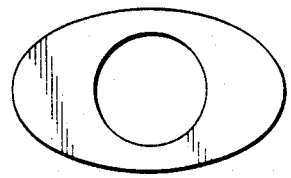
FIGS. 10A and 10B illustrate cross-sectional shapes of the metallic insert.
Figure 10B:
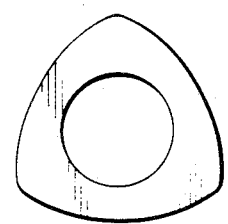

The shape of the metallic insert should be such that the periphery of a cross section thereof is not at a fixed distance from the rotary shaft. Examples of the cross section include deformed circles such as ellipses, triangularly-shaped circles, etc. (See FIGS. 10A and 10B.) It should be noted, however, that the shape of the metallic insert in its lateral cross section should not include a long linear part, as found in a semicircle. In any event, it is essential that when the strand of fibers is wound around the metallic insert, it should come into intimate contact with the entire periphery thereof.

The winding of the fibers may be done by hand, by machine or combination of these two techniques.

The fiber-reinforced plastic structure having a rim and a metallic insert interconnected with spokes is obtained by disposing a winding jig at a prescribed position with the aforementioned metallic insert at the center and winding the resin-impregnated strand of fibers by means of the jig. When this structure is further coated with, e.g., urethane resin, it can be used as a means for the transmission of rotational forces. Examples of such a means include a steering wheel and a spoked wheel having a wheel and a boss interconnected with spokes.

This invention effects the desired joining of the fiber-reinforced resin structure by directly winding the resin-impregnated strand of continuously long-staple fibers fast around the metallic insert thereby preventing the resultant fiber-reinforced plastic structure and the metallic insert from rotating independently of each other. Thus, this method obviates the necessity of subjecting the plastic structure to an after treatment as required in conventional methods. As a result, the possibility of breaking the resin-impregnated strand of fibers and causing strength degradation in the fiber-reinforced plastic structure by the aftertreatment is completely eliminated. Moreover, the joint formed between the resin-impregnated strand of fibers and the metallic insert possesses a much greater strength than obtained by the conventional method. This is due to the fact that this joint is produced by winding the resin-impregnated strand of fibers around the metallic insert. The rotatable element consequently produced is capable of transmitting greater rotational forces. Since the aftertreatment is no longer required, assembly time is decreased and productivity is improved as compared with the conventional method. Further, since the method of this invention does not require an adhesive agent, the strength of bonding does not depend on the adhesive strength of the adhesive agent. The joint enjoys high reliability because it offers high resistance to abrupt changes of temperature. The rotatable element produced by the use of the method of this invention, therefore, features decisive strength and outstanding reliability of the joint as well as light weight. It possesses ample stability to withstand very harsh mechanical and thermal shocks.

In the following exemplary embodiments, the methods of joining described in the following working examples are applied to the production of steering wheels for automobiles. This invention is of course similarly applicable to other wheels, hand-wheels or the like such as, for example, operating handles in stationary machines.

Other features of the invention will become apparent in the course of the following description of exemplary embodiments in which like reference numerals designate identical or corresponding parts throughout the several views. The following exemplary embodiments are given for illustration of the invention and are not intended to be limiting thereof.

EXAMPLE 1

A steering wheel 1 illustrated in FIG. 1 comprises a metallic insert 2 roughly in the shape of a ring disposed at the hub portion and a fiber-reinforced plastic structure 3 forming spoke portions and a ring portion. This steering wheel 1 is formed, as illustrated in the enlarged view of FIG. 2 and FIG. 3, by first preparing the metallic insert 2 provided on the outer periphery thereof with eight cylindrical engaging pins 4, setting the metallic insert 2 in place, then winding a resin-impregnated strand of fibers produced by impregnating continuous long-staple fibers such as glass fibers, carbon fibers etc. with polyester resin, alternately from the lateral (right and left) directions around the engaging pins 4 on the outer periphery of the metallic insert 2 over a substantial circumferential portion of the insert and, at the same time, forming spoke portions and a rim portion with the same strand of fibers 5. The steering wheel thus produced is secured in an automobile by fitting means 6 formed at the center of the metallic insert 2 to be fitted fast on a handle shaft (not shown) of the rotary shaft. In the steering wheel 1 thus made, the fact that the resin-impregnated strand of fibers 5 is immobilized by being wound fast in a zig-zagging pattern at the engaging pins 4, provides that the fiber-reinforced plastic structure 3 and the metallic insert 2 are joined to each other with strength notably enhanced from the level obtained in the steering wheel produced by the conventional method. When the cylindrical engaging pins are substituted with headed engaging pins 4a illustrated in FIG. 4A or with engaging pins headed at the top and knurled on the peripheral surface as illustrated in FIG. 4B, the magnitude of the resistance offered to the load, such as rotational forces, will be further increased resulting in a joint enjoying even further enhanced strength.

EXAMPLE 2

Figure 5:
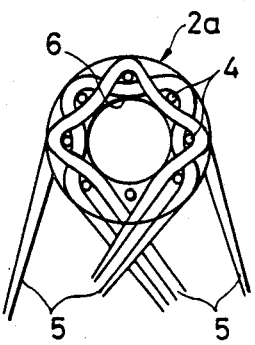
FIGS. 5 and 6 are a front view and a side view, respectively, illustrating the hub portion during the course of the formation of the steering wheel embodying a method according to this invention and described in Example 2.
Figure 6:
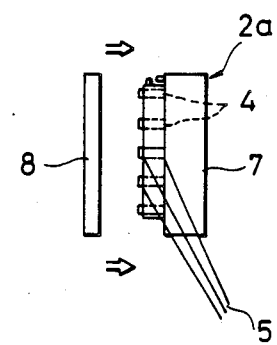

A steering wheel in this example is produced, as illustrated in FIG. 5 and FIG. 6, by preparing a metallic insert 2a composed of an insert proper 7 roughly in the shape of a ring and a lid 8 and provided with eight cylindrical engaging pins 4 disposed in the axial direction of a fitting means 6 of the insert proper 7 as circumferentially spaced around the fitting means 6. A resin-impregnated strand of continuous long-staple fibers 5 is then wound a substanial circumferential portion of the insert in a manner such that said strands pass alternately on the inside and the outside of the engaging pins 4 of the metallic insert proper 7 and, at the same time, form spoke parts and a rim part with the same strand of fibers 5. A lid 8 is subsequently applied to the insert proper 7, under pressure. By the method of Example 2, since the resin-impregnated strand of fibers 5 is reinforced against the load exerted in the axial direction of the fitting means 6 by the strand of fibers 5 being compressively nipped between the metallic insert proper 7 and the lid 8, the strength of bonding between the fiber-reinforced plastic structure and the metallic insert 2a is even further enhanced over that of the steering wheel of Example 1.

EXAMPLE 3

Figure 7:
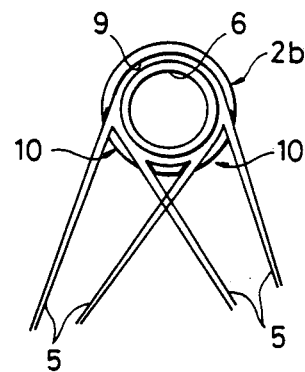
FIGS. 7 and 8 are a front view and a side view, respectively, illustrating the hub portion during the course of the formation of the steering wheel embodying a method according to this invention and described in Example 3.
Figure 8:
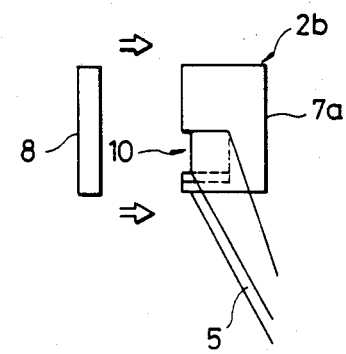

A steering wheel in this example was formed, as illustrated in FIG. 7 and FIG. 8, by preparing a metallic insert 2b composed of metallic insert proper 7a having an engaging groove 9 formed around a fitting means 6 and a lid 8. Resin-impregnated strands of continuous long-staple fibers 5 are then wound and sequentially superposed inside the engaging groove 9 of the metallic insert proper 7a. At the same time, the strands of fibers 5 are lead out of the engaging groove 9 through winding ports 10, formed in the outer wall of the metallic insert proper 7a. Spoke portions and a ring portion are thus formed with the same strands of fibers. Subsequently the lid 8 is applied with pressure to the metallic insert proper 7a. Also by the method of Example 3, the force of bonding between the fiber-reinforced plastic structure and the metallic insert 2b is notably enhanced by the fact that the resin-impregnated strands of fibers 5 are joined by being wound in the engaging groove 9. Moreover, by this method, it has been found that the continuous long-staple reinforcing fibers themselves sustain absolutely no damage because the strands of fibers 5 are not bent sharply at any point.

EXAMPLE 4

Figure 9:
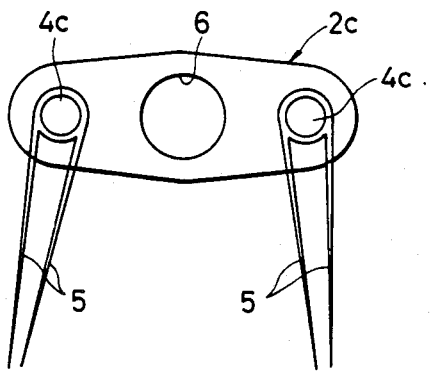
FIG. 9 is a front view illustrating the hub portion during the course of the formation of the steering wheel embodying a method according to this invention and described in Example 4.

A steering wheel in this example was produced, as illustrated in FIG. 9, by preparing a metallic insert 2c having engaging pins 4c, each of a large diameter and disposed laterally symmetrically from a fitting means 6. Resin-impregnated strands of continuous long-staple fibers 5 are then wound one each around the engaging pins 4c of the metallic insert 2c, forming spoke parts with the same strands of fibers 5. Also by the method of Example 4, the strength of bonding between the fiber-reinforced plastic structure and the metallic insert 2c was enhanced above the level obtainable by the conventional method owing to the fact that the strands of fibers 5 were joined by being wound on the pins 4c of large diameter. Moreover, the work of joining was very simple because the parts being joined were simply separated from the fitting means. Virtually no dispersion occurred in the strength of joining. Similarly to the steering wheel of Example 3, the continuously long-staple reinforcing fibers sustained no damage.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for making a rotatable element including a metallic insert, a rim portion and spokes connecting the insert and rim portion, said method comprising the steps of:
   (i) winding a resin-impregnated strand of continuous long-staple fibers around an engaging member formed on a fitting means in the form of a metallic insert by winding said resin-impregnated strand of continuous long-staple fibers in a repeated pattern around a substantial circumferential portion of said insert while placing said fibers in a zig-zag pattern about a multiplicity of radially extending engaging pins provided on said metallic insert; and
   (ii) forming said spokes and rim with said strands, said spokes extending outwardly from said metallic insert.

2. A method for making a rotatable element including a metallic insert, a rim portion and spokes connecting the insert and rim portion, said method comprising the steps of:
   (i) winding a resin-impregnated strand of continuous long-staple fibers around an engaging member formed on a fitting means in the form of a metallic insert by winding said resin-impregnated strand of continuous long-staple fibers in a repeated pattern around a substantial circumferential portion of said insert while placing said fibers in an inside and outside pattern about a multiplicity of axially extending engaging pins provided on said metallic insert; and
   (ii) forming said spokes and rim with said strands, said spokes extending outwardly from said metallic insert.

* * * * *